(12) United States Patent
Cheswick

(10) Patent No.: US 8,578,474 B2
(45) Date of Patent: *Nov. 5, 2013

(54) APPARATUS, METHODS, AND COMPUTER PROGRAM PRODUCTS FOR ENTERING SECURE PASSWORDS

(75) Inventor: William Roberts Cheswick, Bernardeville, NJ (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/441,330

(22) Filed: Apr. 6, 2012

(65) Prior Publication Data

US 2012/0198546 A1    Aug. 2, 2012

Related U.S. Application Data

(63) Continuation of application No. 12/565,134, filed on Sep. 23, 2009, now Pat. No. 8,181,029.

(51) Int. Cl.
*G06F 21/00* (2013.01)
(52) U.S. Cl.
USPC .......................................................... 726/18
(58) Field of Classification Search
USPC .......................................................... 726/18
See application file for complete search history.

(56) References Cited

U.S. PATENT DOCUMENTS

| | | |
|---|---|---|
| 6,934,860 B1 | 8/2005 | Goldstein |
| 7,219,368 B2 | 5/2007 | Juels et al. |
| 7,243,239 B2 | 7/2007 | Kirovski et al. |
| 7,849,323 B2 | 12/2010 | Field et al. |
| 2004/0010721 A1 | 1/2004 | Kirovski et al. |
| 2007/0113294 A1 | 5/2007 | Field et al. |
| 2007/0266428 A1 | 11/2007 | Downes et al. |
| 2008/0016369 A1 | 1/2008 | Kirovski et al. |
| 2008/0201578 A1 | 8/2008 | Drake |
| 2010/0186074 A1 | 7/2010 | Stavrou et al. |
| 2010/0287382 A1 | 11/2010 | Gyorffy et al. |

*Primary Examiner* — Michael S McNally
(74) *Attorney, Agent, or Firm* — Myers Bigel Sibley & Sajovec, P.A.

(57) ABSTRACT

Apparatus, methods and/or computer program products are provided that facilitate entering secure passwords into a user device. A user requested image is displayed via a display or monitor of a user device. The image is zoomable to one or more higher resolution levels beyond an initial display resolution, and the image is displayed at higher resolution levels in response to a user activating a zoom function via the user device. The coordinates of a user selected feature within a displayed higher resolution level image are obtained and translated into a password. The password is then entered into the requesting application.

20 Claims, 7 Drawing Sheets

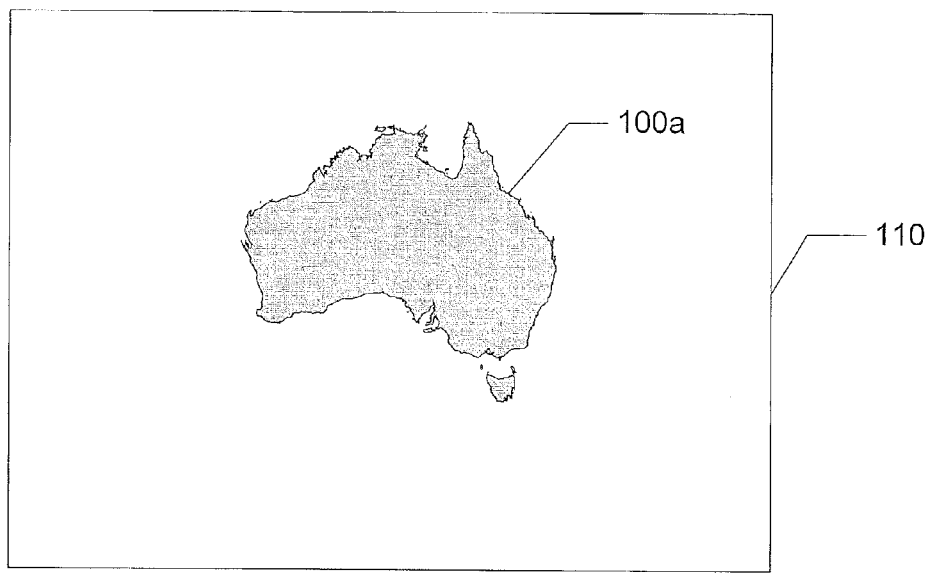
Fig. 3
Fig. 4
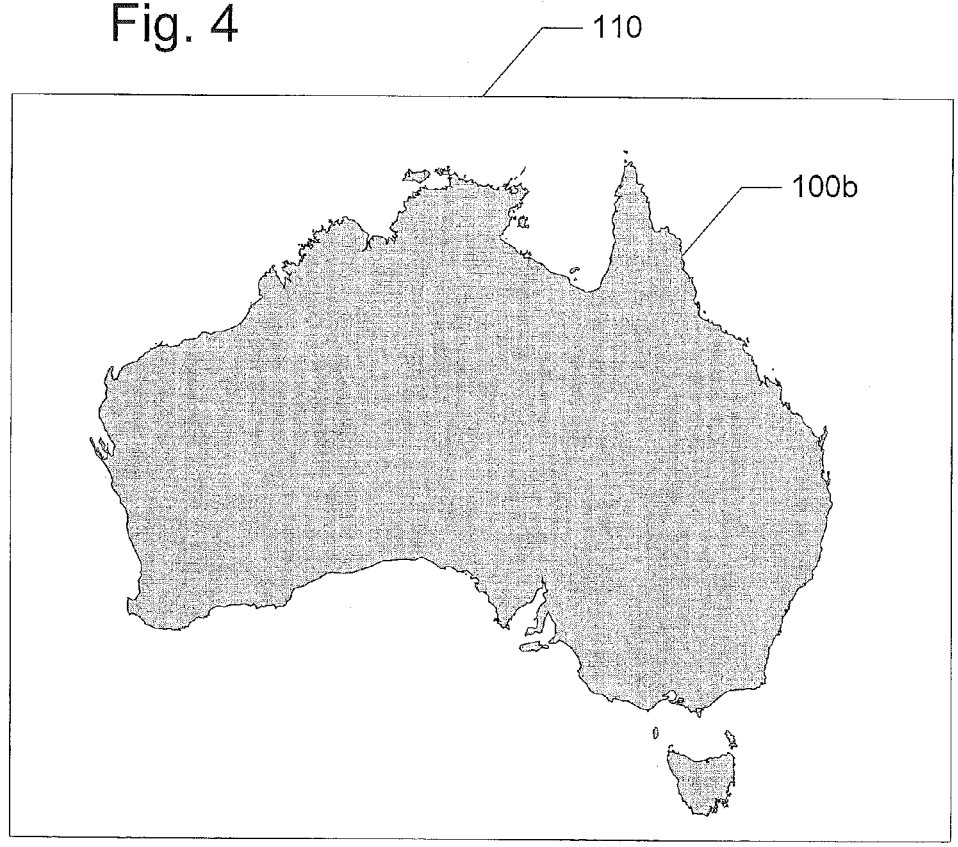

APPARATUS, METHODS, AND COMPUTER PROGRAM PRODUCTS FOR ENTERING SECURE PASSWORDS

CROSS-REFERENCE TO RELATED PATENT APPLICATION

This application is a continuation application of U.S. patent application Ser. No. 12/565,134, filed Sep. 23, 2009, now U.S. Pat. No. 8,181,029 the disclosure of which is incorporated herein by reference as if set forth in its entirety.

BACKGROUND

The present application relates generally to computer systems and applications, and, more particularly, to passwords for accessing computer systems and applications.

Communications networks are widely used for nationwide and worldwide communication of voice, multimedia and/or data. As used herein, the term "communications networks" includes public communications networks, such as the Public Switched Telephone Network (PSTN), terrestrial and/or satellite cellular networks, private networks and/or the Internet.

The Internet is a decentralized network of computers that can communicate with one another via Internet Protocol (IP). The Internet includes the World Wide Web (web) service facility, which is a client/server-based facility that includes a large number of servers (computers connected to the Internet) on which web pages or files reside, as well as clients (web browsers), which interface users with the web pages. The topology of the web can be described as a network of networks, with providers of network services called Network Service Providers, or NSPs. Servers that provide application-layer services may be referred to as Application Service Providers (ASPs). Sometimes a single service provider provides both functions.

It is common to use passwords, such as Personal Identification Numbers (PINs) and text-based passwords, to allow users to access various computer applications, web-based services, computer systems, and other types of communications networks. While security may be enhanced by creating longer, more complex passwords, such passwords may become more difficult to remember. In fact, studies have shown that users as a result tend to pick shorter, more predictable passwords.

In addition, because the use of passwords is pervasive, it may not be unusual for a user to have to remember a large number of different passwords. However, it may be difficult for users to remember large numbers of passwords, particularly complex passwords that satisfy strong security measures. In addition, because users may be required to generate new passwords periodically, many users may create passwords that are sufficient to satisfy only the minimum level of security deemed acceptable.

SUMMARY

According to exemplary embodiments, apparatus, methods and/or computer program products are provided that facilitate entering secure passwords into requesting applications, services and computer systems. In some embodiments, a method of entering a password via a user device includes displaying a user requested image within a display or monitor of a user device. The image is zoomable to one or more higher resolution levels beyond an initial display resolution, and the image is displayed at higher resolution levels in response to a user activating a zoom function via the user device. The coordinates of a user selected feature within a displayed higher resolution level image are obtained. For example, a user zooms in to a specific feature and, via an input device (e.g., a mouse, a keyboard, a touch screen, etc.), positions a cursor at the feature. Upon activation of the input device (e.g., a mouse click, a keyboard entry, touching a display screen, etc.) the coordinates for a location of the cursor are obtained. The obtained coordinates are translated into a password and entered into the user device.

In some embodiments, zoomable images are located remotely and are obtained by a user device via a communications network, such as the Internet. For example, a user device accesses a remote image source via a browser or other client program and retrieves and displays images via the browser. In other embodiments, zoomable images may be located locally on a user device and are retrieved and displayed directly from local storage. In other embodiments, zoomable images may be generated by a user device. For example, a user requested image may be generated by a mathematical operation performed by a user device, such as a fractal operation.

According to some embodiments, user requested images are zoomable geographic images, such as images of the Earth's surface. In other embodiments, user requested images are zoomable images of celestial bodies, such as planets and deep sky objects. In other embodiments, user requested images are zoomable images that are generated locally on a user device via a mathematical operation.

According to embodiments, a computer program product for entering a password includes a computer readable storage medium having encoded thereon instructions that, when executed on a computer, cause the computer to: display a user requested image within a display of the computer; display at least a portion of the image at a higher resolution level in response to user activation of a zoom function associated with the display; obtain coordinates of a feature within the higher resolution level image; translate the obtained coordinates into a password; and enter the password into an application. In some embodiments, the computer readable storage medium has encoded thereon instructions that, when executed on a computer, causes the computer to obtain the image from a remote source via a communications network. In some embodiments, the computer readable storage medium has encoded thereon instructions that, when executed on a computer, causes the computer to generate the user requested image by a mathematical operation.

According to embodiments, a computer apparatus, comprising a processor, is configured to: display a user requested image within a display of the device, wherein the image is zoomable to one or more higher resolution levels beyond an initial display resolution; display at least a portion of the image at a higher resolution level in response to user activation of a zoom function associated with the display; obtain coordinates of a feature within the higher resolution level image; translate the obtained coordinates into a password; and enter the password into an application.

Other methods, apparatus and/or computer program products according to exemplary embodiments will be or become apparent to one with skill in the art upon review of the following drawings and detailed description. It is intended that all such additional systems, methods, and/or computer program products be included within this description, be within the scope of the present invention, and be protected by the accompanying claims.

BRIEF DESCRIPTION OF THE DRAWINGS

The accompanying drawings, which form a part of the specification, illustrate some exemplary embodiments. The drawings and description together serve to fully explain the exemplary embodiments.

FIG. 3 is a zoomable geographic image of a portion of the Earth's surface that may be utilized in conjunction with embodiments.

FIGS. 4 and 5 are higher resolution level images of the image of FIG. 3 that are displayed as a result of a user implementing a zoom function on a user device.

DETAILED DESCRIPTION

Figure 1:
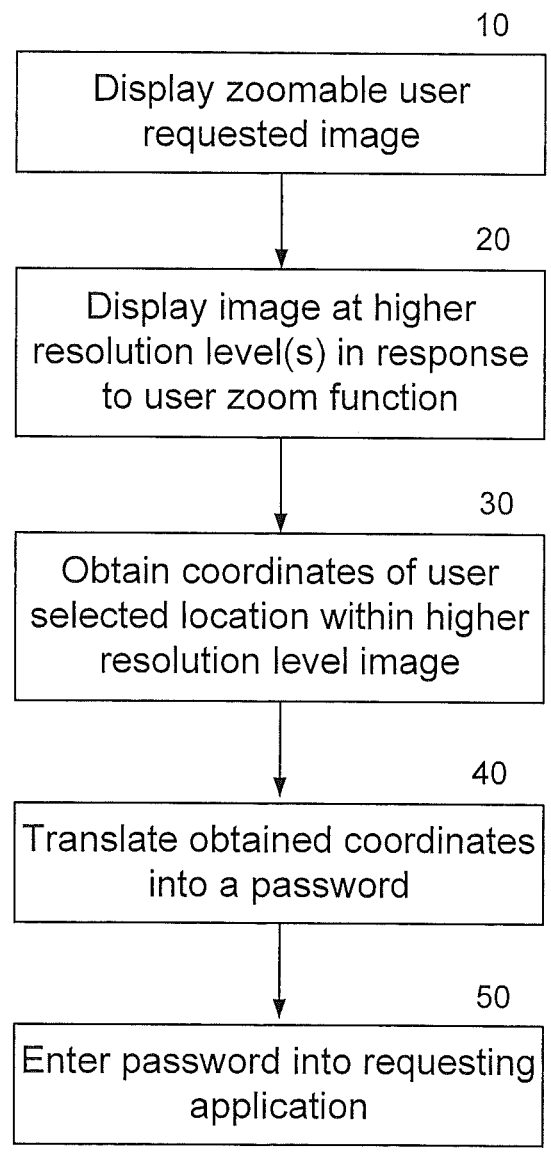
FIG. 1 is a flowchart that illustrates exemplary operations for entering a password via a user device, according to some embodiments.

While various modifications and alternative forms of the embodiments described herein may be made, specific embodiments are shown by way of example in the drawings and will herein be described in detail. It should be understood, however, that there is no intent to limit the invention to the particular forms disclosed, but on the contrary, the invention is to cover all modifications, equivalents, and alternatives falling within the spirit and scope of the invention as defined by the claims. Like reference numbers signify like elements throughout the description of the figures.

As used herein, the singular forms "a," "an," and "the" are intended to include the plural forms as well, unless expressly stated otherwise. It should be further understood that the terms "comprises" and/or "comprising" when used in this specification are taken to specify the presence of stated features, steps, operations, elements, and/or components, but do not preclude the presence or addition of one or more other features, steps, operations, elements, components, and/or groups thereof. It will be understood that when an element is referred to as being "connected" or "coupled" to another element, it can be directly connected or coupled to the other element or intervening elements may be present. Furthermore, "connected" or "coupled" as used herein may include wirelessly connected or coupled. As used herein, the term "and/or" includes any and all combinations of one or more of the associated listed items and may be abbreviated as "/".

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the specification and relevant art and should not be interpreted in an idealized or overly formal sense unless expressly so defined herein. Well-known functions or constructions may not be described in detail for brevity and/or clarity.

It will be understood that, although the terms first, second, etc. may be used herein to describe various elements, these elements should not be limited by these terms. These terms are only used to distinguish one element from another.

Exemplary embodiments are described below with reference to block diagrams and/or flowchart illustrations of methods, apparatus (systems and/or devices) and/or computer program products. It is understood that a block of the block diagrams and/or flowchart illustrations, and combinations of blocks in the block diagrams and/or flowchart illustrations, can be implemented by computer program instructions. These computer program instructions may be provided to a processor of a general purpose computer, special purpose computer, and/or other programmable data processing apparatus to produce a machine, such that the instructions, which execute via the processor of the computer and/or other programmable data processing apparatus, create means (functionality) and/or structure for implementing the functions/acts specified in the block diagrams and/or flowchart block or blocks.

These computer program instructions may also be stored in a computer-readable memory that can direct a computer or other programmable data processing apparatus to function in a particular manner, such that the instructions stored in the computer-readable memory produce an article of manufacture including instructions which implement the functions/acts specified in the block diagrams and/or flowchart block or blocks.

The computer program instructions may also be loaded onto a computer or other programmable data processing apparatus to cause a series of operational steps to be performed on the computer or other programmable apparatus to produce a computer-implemented process such that the instructions which execute on the computer or other programmable apparatus provide steps for implementing the functions/acts specified in the block diagrams and/or flowchart block or blocks.

Accordingly, exemplary embodiments may be implemented in hardware and/or in software (including firmware, resident software, micro-code, etc.). Furthermore, exemplary embodiments may take the form of a computer program product on a computer-usable or computer-readable storage medium having computer-usable or computer-readable program code embodied in the medium for use by or in connection with an instruction execution system. In the context of this document, a computer-usable or computer-readable medium may be any medium that can contain, store, communicate, propagate, or transport the program for use by or in connection with the instruction execution system, apparatus, or device.

The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium would include the following: an electrical connection having one or more wires, a portable computer diskette, a random access memory (RAM), a read-only memory (ROM), an erasable programmable read-only memory (EPROM or Flash memory), an optical fiber, and a portable compact disc read-only memory (CD-ROM). Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory.

Computer program code for carrying out operations of data processing systems discussed herein may be written in a high-level programming language, such as Python, Java, AJAX (Asynchronous JavaScript), C, and/or C++, for development convenience. In addition, computer program code for carrying out operations of exemplary embodiments may also be written in other programming languages, such as, but not limited to, interpreted languages. Some modules or routines may be written in assembly language or even micro-code to enhance performance and/or memory usage. However, embodiments are not limited to a particular programming language. It will be further appreciated that the functionality of any or all of the program modules may also be implemented using discrete hardware components, one or more application specific integrated circuits (ASICs), or a programmed digital signal processor or microcontroller.

It should also be noted that in some alternate implementations, the functions/acts noted in the blocks may occur out of the order noted in the flowcharts. For example, two blocks shown in succession may in fact be executed substantially concurrently or the blocks may sometimes be executed in the reverse order, depending upon the functionality/acts involved. Moreover, the functionality of a given block of the flowcharts and/or block diagrams may be separated into multiple blocks and/or the functionality of two or more blocks of the flowcharts and/or block diagrams may be at least partially integrated.

Embodiments allow users to utilize passwords that are extremely secure and without requiring users to have to remember the actual passwords. According to embodiments, a user need only remember a location in a zoomable image that he/she can repetitively find.

According to some embodiments, a user initially identifies a feature in a high resolution image associated with an initial zoomable image. This feature can be anything in the image such as a house, a factory, a corn field, a pond, an island, a portion of a mountain, etc., that the user can remember how to locate. The geographical coordinates of the feature are used as the password. For example, if the user selects a small pond in a region of Tasmania, the longitude and latitude coordinates 41° 42' 25.92" S and 126° 08' 56.41" E are used to form the user's password. For example, in some embodiments, the coordinates are concatenated into a single character string (e.g., 41422592S126085641E). This string is a very secure password because of the large number of bits and because the lack of alphabetically sequential characters and lack of numerically sequential characters creates uniqueness and causes the password to become difficult to derive by others. However, the user need not have to remember this long string of characters. The user need only remember how to locate the pond again within a zoomable image. It may be preferable for password security purposes that a feature for which coordinate are utilized as a password not be viewable in images at lower resolution levels in order to inhibit others from easily determining what the location is (and subsequently what the password is).

Embodiments can utilize zoomable geographical images, such as images of the Earth's surface. For example, a satellite image of the earth from a mapping service, such as Google® Earth, allows a user to display images of the Earth's surface at varying levels of resolution. At some locations, the degree of resolution can be such that objects only feet or even inches across can be viewed. However, embodiments can utilize any type of zoomable images and are not limited to zoomable geographic images. For example, zoomable images of celestial bodies, such as planets and deep sky objects (galaxies, nebulae, etc.), may be utilized. As with terrestrial images, a user could select, for example, a small object or crater on the surface of Mars that is visible in a high level resolution image, such as Mars Global Surveyor images available from Malin Space Science Systems, Inc., San Diego, Calif. (www.msss.com). Other zoomable images of celestial objects that may be utilized in accordance with embodiments include, but are not limited to, images from the Sloan Deep Sky Survey (www.sdss.org), images from the Space Telescope Science Institute Digital Sky Survey (archive.stsci.edu), etc.

In some embodiments, zoomable images are located remotely and are obtained by a user device via a communications network, such as the Internet. For example, a user device accesses a remote image source (e.g., satellite image database, celestial image database, etc.) via a browser or other client program and retrieves and displays images via the browser. In other embodiments, zoomable images may be located locally on a user device and are retrieved and displayed directly from local storage. In other embodiments, zoomable images may be generated by a user device. For example, a user requested image may be generated by a mathematical operation performed by a user device, such as a fractal operation described below.

FIG. 1 is a flowchart of operations for facilitating entering passwords, according to some embodiments. Initially, a user requested image is displayed by a user device processor utilizing a display or monitor associated with the user device (Block 10). The image is zoomable to one or more higher resolution levels beyond an initial display resolution, and the image is displayed at higher resolution levels in response to a user activating a zoom function via the processor (Block 20). In some embodiments, a user requested image is zoomable to at least two higher resolution levels. In some embodiments, a user requested image is zoomable to at least ten higher resolution levels. Embodiments are not limited to a particular number of resolution levels that an image can be zoomed to. However, security of a password may increase with each additional resolution level.

Figure 2:
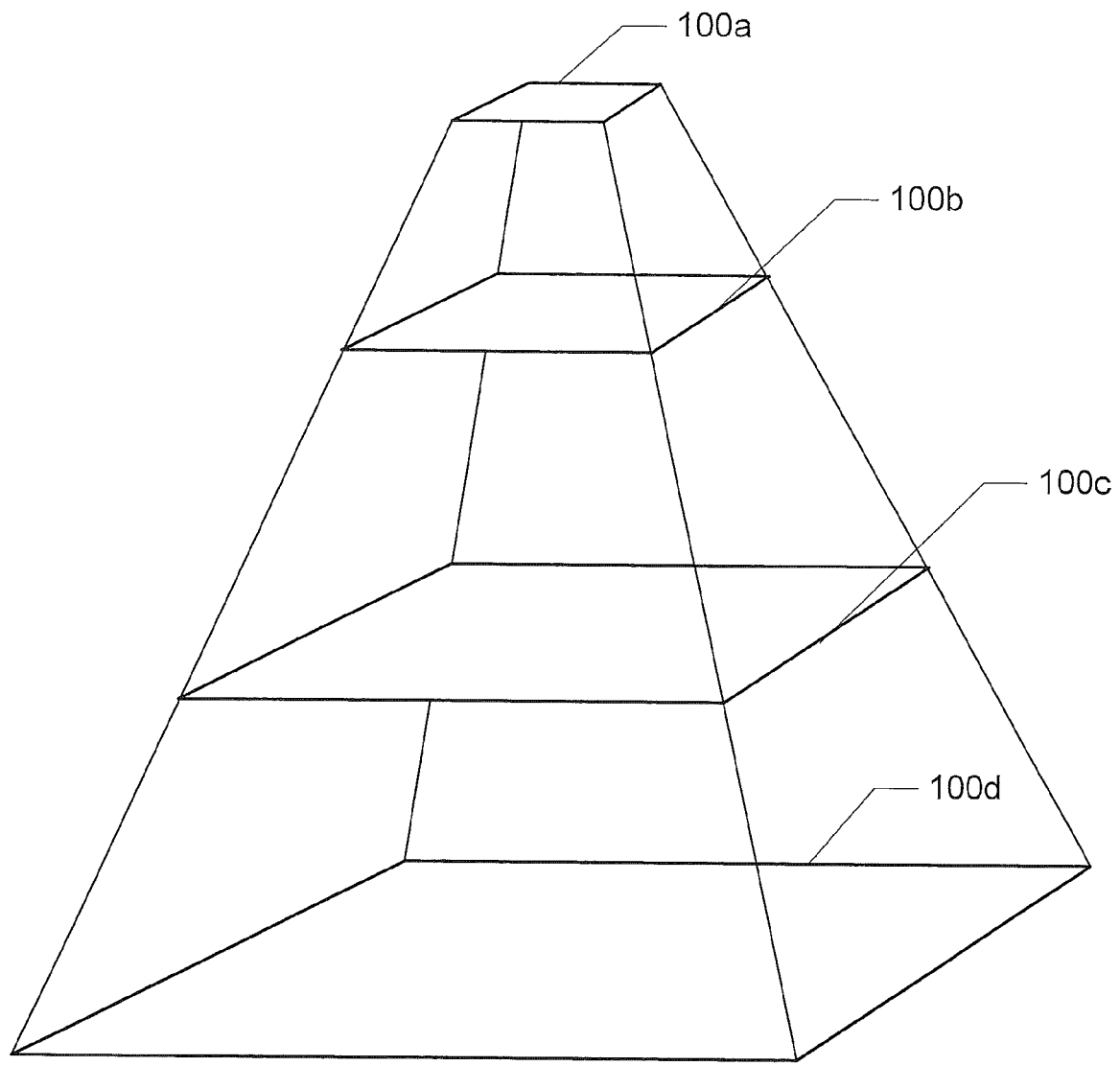
FIG. 2 is a hierarchical representation of an image having multiple levels of resolution.

FIG. 2 is a hierarchical representation of multiple levels of resolution associated with an image. Image 100a is a low resolution image and represents a user requested image that a user will select and zoom in on to a specific feature. Images 100b-100d each represent associated images with respective higher levels of resolution. A user beginning at image 100a will implement a zoom function to view the respective higher levels of resolution. Zoom functions, zooming in on an image, and the display of higher resolution images are well understood by those skilled in the art and need not be described further herein.

Referring back to FIG. 1, the coordinates of a user selected feature within a high resolution level image are obtained by a user device processor (Block 30). For example, a user zooms in to a specific feature and, via an input device (e.g., a mouse, a keyboard, a touch screen, etc.), positions a cursor at the location of the feature. Upon activation of the input device (e.g., a mouse click, a keyboard entry, touching a display screen, etc.) the coordinates for the feature of the cursor are obtained. As described above, the image may be a geographical image and the coordinates may be geographical coordinates, such as longitude and latitude, etc. In other embodiments, the image may be a celestial object image and the coordinates may be celestial coordinates, such as declination and right ascension, etc. In other embodiments, the image may be generated by a mathematical operation and the coordinates may be Cartesian coordinates, etc.

The obtained coordinates are translated into a password by a processor configured to concatenate multiple character strings of the coordinates into a single character string (Block 40). The concatenation process is configured to remove characters and spaces that are not used in passwords from the obtained coordinates and to combine the coordinates into a single string of alphanumeric characters. For example, as described above, the coordinates 41° 42' 25.92" S and 126° 08' 56.41" E when concatenated become 41422592S126085641E, which is a very secure password because of the large number of bits and because it may not be easily discerned by others. The password is then entered into a requesting application or service via the user device (Block 50). The password may (or may not) be displayed within a display or monitor of the device. In some embodiments, the characters of the password may be hidden or masked, or substitute characters may be displayed (e.g., "*" may be used for each character). In some embodiments, multiple coordinates need not be concatenated into a single Character string. Multiple character strings may be produced via concatenation and used as a password.

As used herein, the term "alphanumeric character" includes any type of character that can be used in a password, such as alphabetic characters, numeric characters, and other characters such as underscores, backslashes, etc.

A processor, according to some embodiments, may allow for some deviation in the user's positioning of a cursor within an image. For example, it may be difficult for a user to precisely position a cursor within an image at an exact location each time. As such, the processor can allow for some variation. For example, using the above example coordinates, a user may only be able to position a cursor within an image within an accuracy of ±5" (e.g., 41° 42' 25.92" S±5" and 126° 08' 56.41" E±5"). In other words, if the cursor position in an image is between 41° 42' 20.92" S–41° 42' 30.92" S and 126° 08' 51.41" E–126° 08' 61.41" E, that will be accurate enough for use as the password, when concatenated. According to embodiments, if a user does not position a cursor at a feature within a predefined error range, the processor may prompt the user that the password is not valid and to try and reposition the cursor more accurately at the location.

Figure 5:
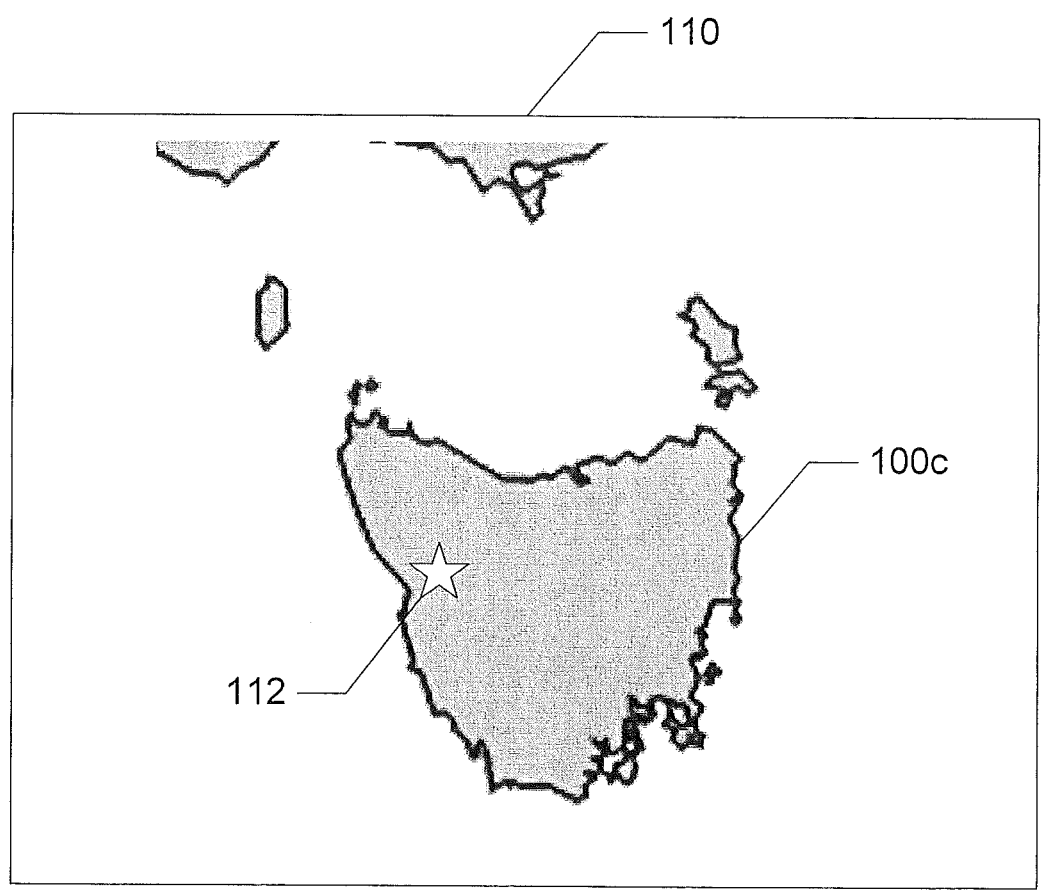
Figure 6:
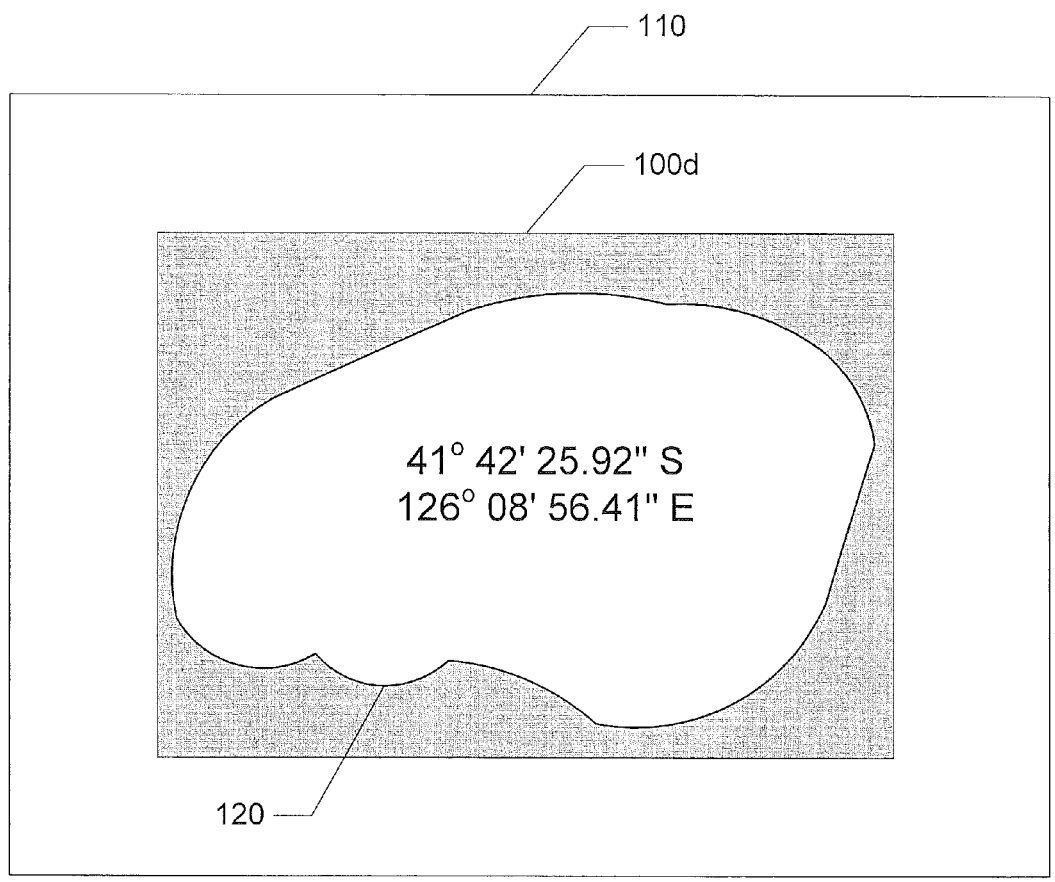
FIG. 6 is a high resolution level image of a portion of the image of FIG. 3 that illustrates a user selected feature and that illustrates coordinates for the feature, according to some embodiments.

FIGS. 3-6 illustrate a user zooming in on an image to a location, according to some embodiments. In FIG. 3, a zoomable image 100a of Australia, requested by a user, is displayed within a display 110 of a user device. The user device is in communication with a remotely located database service and retrieves the image therefrom. An exemplary service is Google® Earth. The image 100a of Australia displayed in FIG. 3 has a resolution low enough such that a feature for which the user utilizes the coordinates for a password is not visible. FIGS. 4-6 show progressive zooming steps (i.e., the display of images of higher resolution) by the user until the feature is displayed. The feature is the edge of a small pond near the city of Queenstown in Tasmania (112 in FIG. 5), and is designated as 120 in the high resolution image 100d of FIG. 6.

Figure 7:
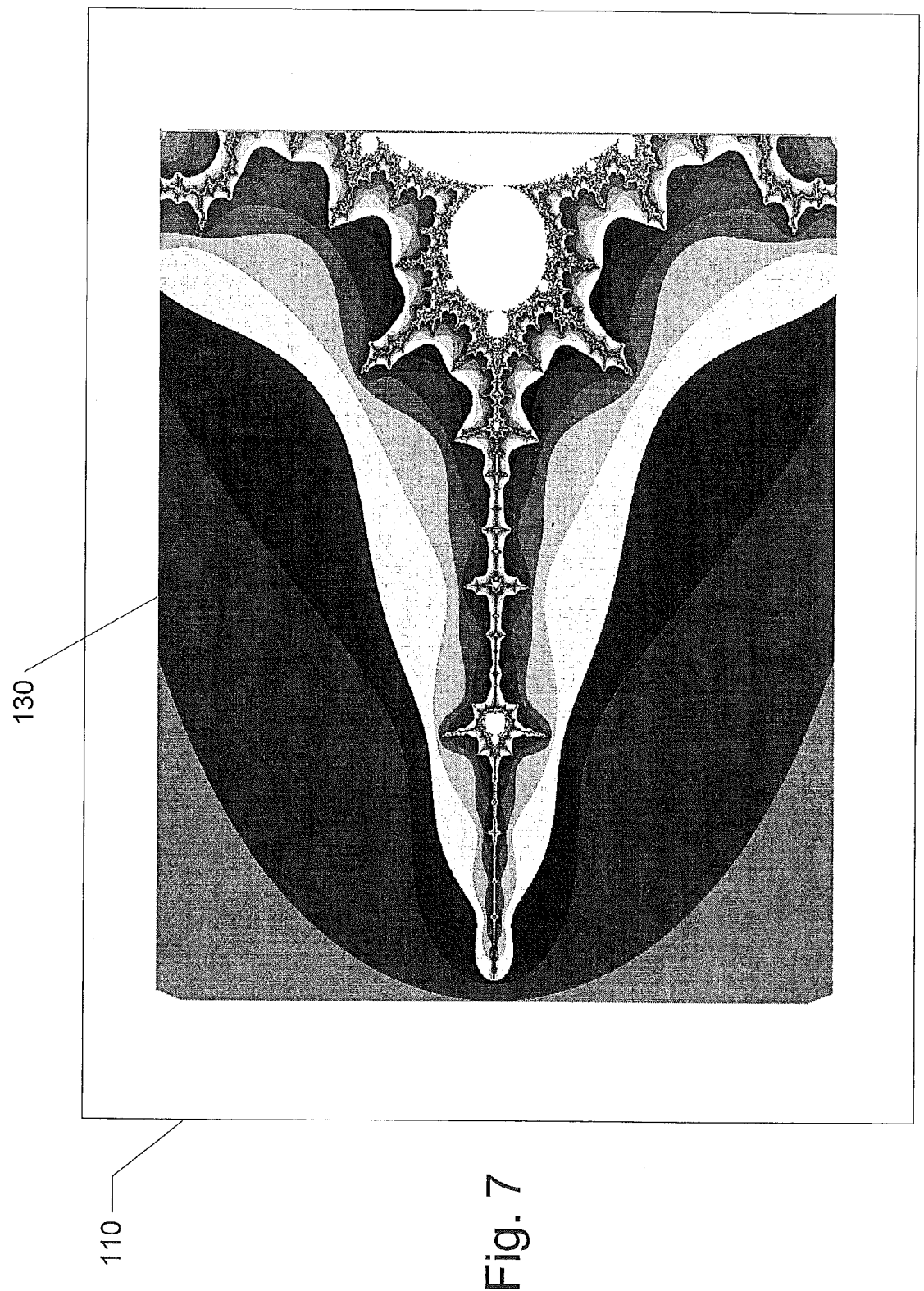
FIG. 7 is a zoomable image generated locally by a user device using a Mandelbrot set, according to some embodiments.

Referring to FIG. 7, a zoomable image 130 generated by a user device is displayed within the user device display 110. The illustrated image 130 is generated using a fractal, such as the Mandelbrot set. As known to those skilled in the art of fractals, fractals are objects that display self-similarity at various scales. Magnifying a fractal reveals small-scale details similar to the large-scale characteristics. Although the Mandelbrot set is self-similar at magnified scales, the small scale details are not identical to the whole. In fact, the Mandelbrot set is infinitely complex. A user can zoom in to a feature in the fractal as described above and obtain coordinates, such as X-Y coordinates of the feature for use as a password.

Figure 8:
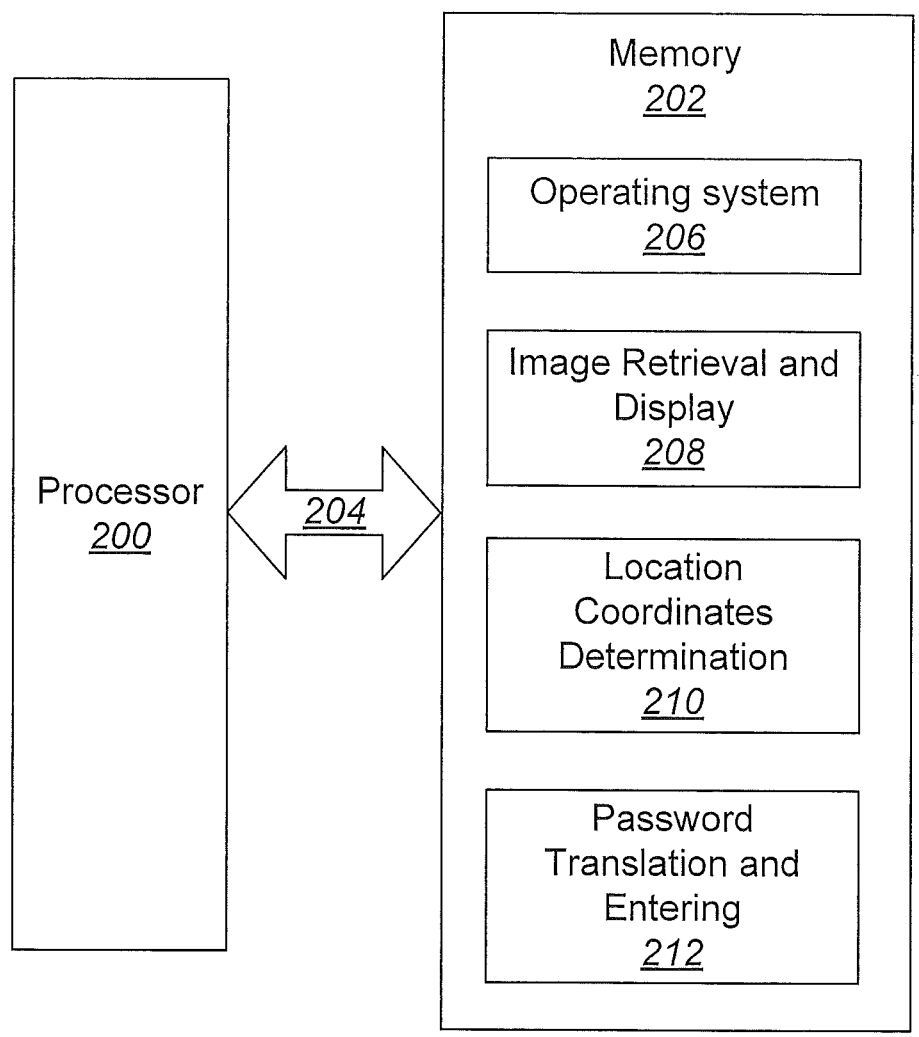
FIG. 8 is a block diagram that illustrates details of an exemplary processor and memory that may be used to enter passwords, according to some embodiments.

FIG. 8 illustrates an exemplary processor 200 and memory 202 that may be used by a user device, according to some embodiments. The processor 200 communicates with the memory 202 via an address/data bus 204. The processor 200 may be, for example, a commercially available or custom microprocessor. The memory 202 is representative of the overall hierarchy of memory devices containing the software and data used to implement a device or system for creating and managing secure passwords as described herein, in accordance with some embodiments. The memory 202 may include, but is not limited to, the following types of devices: cache, ROM, PROM, EPROM, EEPROM, flash, SRAM, and DRAM.

As shown in FIG. 8, the memory 202 may hold various categories of software and data: an operating system 206, an image retrieval and display module 208, a location coordinates determination module 210, and a password translation and entering module 212. The operating system 206 controls operations of the user device used to obtain and enter passwords based on locations within zoomable images. In particular, the operating system 206 may manage the resources of a device and may coordinate execution of various programs (e.g., the image retrieval and display module 208, location coordinates determination module 210, and password translation and entering module 212, etc.) by the processor 200.

The image retrieval and display module 208 comprises logic for retrieving and displaying zoomable images, as described above. For example, the image retrieval and display module 208 may incorporate a browser or other client program that is configured to retrieve images from remote locations via a communications network. In some embodiments, the image retrieval and display module 208 is configured to generate zoomable images locally, such as images produced via a mathematical operation, and display them within a display or monitor of a user device. The location coordinates determination module 210 comprises logic for obtaining the coordinates of a cursor positioned by a user on a location of a feature within an image, as described above. These coordinates may include geographical coordinates, celestial coordinates, Cartesian coordinates, etc. The password translation and entering module 212 comprises logic for concatenating character strings and otherwise preparing coordinates for use as passwords, as described above.

Many variations and modifications can be made to the preferred embodiments without substantially departing from the principles of the present invention. All such variations and modifications are intended to be included herein within the scope of the present invention, as set forth in the following claims.

That which is claimed:

1. A method of generating a password via a user device, comprising:

displaying an image within a display of the user device, wherein the image is zoomable to a higher resolution level beyond an initial display resolution;

displaying at least a portion of the image at the higher resolution level in response to user activation of a zoom function associated with the display;

obtaining coordinates of a feature within the higher resolution level image, wherein a location of the feature is indicated by an input device cursor positioned by the user, wherein the feature is not visible in the image at the initial display resolution; and translating the obtained coordinates into a password.

2. The method of claim 1, wherein the image is zoomable to at least two higher resolution levels.

3. The method of claim 1, wherein displaying the image comprises obtaining the image from a remote source via a communications network.

4. The method of claim 1, wherein the image is comprised of images of varying resolution of the Earth's surface.

5. The method of claim 4, wherein displaying the image comprises obtaining the images from a remote source via a communications network.

6. The method of claim 4, wherein the coordinates are geographic coordinates.

7. The method of claim 1, wherein the image comprises images of varying resolution of a celestial object.

8. The method of claim 7, wherein displaying the image comprises obtaining the images from a remote source via a communications network.

9. The method of claim 7, wherein the coordinates are celestial coordinates.

10. The method of claim 1, wherein the image is generated by a mathematical operation.

11. The method of claim 10, wherein the mathematical operation is carried out by the user device.

12. The method of claim 10, wherein the mathematical operation includes a fractal operation.

13. The method of claim 12, wherein the fractal operation utilizes a Mandelbrot set.

14. The method of claim 10, wherein the coordinates are Cartesian coordinates.

15. The method of claim 1, wherein translating the obtained coordinates into a password comprises concatenating one or more character strings.

16. A computer program product for generating a password, the computer program product comprising a non-transitory computer readable storage medium having encoded thereon instructions that, when executed on a computer, cause the computer to perform operations comprising:

displaying an image within a display of the computer, wherein the image is zoomable to a higher resolution level beyond an initial display resolution;

displaying at least a portion of the image at the higher resolution level in response to user activation of a zoom function associated with the display;

obtaining coordinates of a feature within the higher resolution level image, wherein a location of the feature is indicated by an input device cursor positioned by the user, wherein the feature is not visible in the image at the initial display resolution; and translating the obtained coordinates into a password.

17. The computer program product of claim 16, wherein the non-transitory computer readable storage medium has encoded thereon instructions that, when executed on a computer, causes the computer to perform operations comprising:

obtaining the image from a remote source via a communications network.

18. The computer program product of claim 16, wherein the non-transitory computer readable storage medium has encoded thereon instructions that, when executed on a computer, causes the computer to perform operations comprising:

generating the image by a mathematical operation.

19. A computer apparatus, comprising:

a processor to:

a memory that stores instructions that, when executed by the processor, cause the processor to perform operations comprising;

displaying an image within a display, wherein the image is zoomable to a higher resolution level beyond an initial display resolution;

displaying at least a portion of the image at the higher resolution level in response to user activation of a zoom function associated with the display;

obtaining coordinates of a feature within the higher resolution level image, wherein a location of the feature is indicated by an input device cursor positioned by the user, wherein the feature is not visible in the image at the initial display resolution; and translating the obtained coordinates into a password.

20. The computer apparatus of claim 19, wherein the memory stores instructions that, when executed by the processor, cause the processor to perform operations comprising obtaining the image from a remote source via a communications network.

* * * * *

UNITED STATES PATENT AND TRADEMARK OFFICE
CERTIFICATE OF CORRECTION

PATENT NO.        : 8,578,474 B2  
APPLICATION NO.   : 13/441330  
DATED             : November 5, 2013  
INVENTOR(S)       : William Roberts Cheswick Page 1 of 1

It is certified that error appears in the above-identified patent and that said Letters Patent is hereby corrected as shown below:

In the Claims:
  Column 10, Claim 19, Line 21:
  Please correct "a processor to:"
    to read -- a processor; --

Signed and Sealed this
Fourteenth Day of January, 2014

Michelle K. Lee
*Deputy Director of the United States Patent and Trademark Office*